(12) United States Patent
De Blonde et al.

(10) Patent No.: US 11,727,778 B2
(45) Date of Patent: *Aug. 15, 2023

(54) THERMOGRAPHIC DETECTOR DEVICE FOR A FIRE ALARM CONTROL SYSTEM

(71) Applicant: Honeywell International Inc., Charlotte, NC (US)

(72) Inventors: Johnny Julien De Blonde, Oostduinkerke (BE); Marco Di Nubila, Lausanne (CH); Matthew John Naylor, Myrtle Bank (AU); Scott Lang, Geneva, IL (US); Uroj Usmani, Lausanne (CH)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,035

(22) Filed: Nov. 22, 2021

(65) Prior Publication Data

US 2022/0084382 A1 Mar. 17, 2022

Related U.S. Application Data

(63) Continuation of application No. 16/517,079, filed on Jul. 19, 2019, now Pat. No. 11,183,042.

(51) Int. Cl.
*G08B 17/12* (2006.01)
*G06F 13/16* (2006.01)
(Continued)

(52) U.S. Cl.
CPC ....... *G08B 17/125* (2013.01); *G06F 13/1668* (2013.01); *G08B 29/20* (2013.01); *G08B 29/04* (2013.01)

(58) Field of Classification Search
CPC ...... G08B 17/125; G08B 29/20; G08B 29/04; G08B 25/10; G06F 13/1668
See application file for complete search history.

(56) References Cited

U.S. PATENT DOCUMENTS

| | | | | |
|---|---|---|---|---|
| 5,059,953 A | * | 10/1991 | Parsons | G08B 17/12 250/353 |
| 7,227,114 B2 | * | 6/2007 | Sebbag | B64G 1/244 250/203.1 |

(Continued)

FOREIGN PATENT DOCUMENTS

| | | |
|---|---|---|
| CN | 102496235 B | 7/2013 |
| EP | 2492883 A1 | 8/2012 |

(Continued)

OTHER PUBLICATIONS

Flir, "Thermal Imaging Cameras for Warehouse Asset Protection", https://www.flir.in/discovery/instrumentws/manufacturing/thermal-imaging-cameras-for-warehouse-asset-protection/, accessed May 28, 2019, (12 pages).

*Primary Examiner* — Brian Wilson
(74) *Attorney, Agent, or Firm* — Brooks, Cameron & Huebsch, PLLC

(57) ABSTRACT

A thermographic detector device for a fire alarm control system is described herein. In some examples, one or more embodiments include a thermography camera configured to capture a thermal image within a field of view of the thermographic detector device, a memory and a processor to execute instructions stored in the memory to detect a fault associated with the thermographic detector device, wherein the fault includes at least one of a field of view fault, an operating parameter fault, and an internal fault, generate a fault signal upon detecting the fault, and provide a notification of the fault using the fault signal.

18 Claims, 4 Drawing Sheets

(51) Int. Cl.
*G08B 29/20* (2006.01)
*G08B 29/04* (2006.01)

(56) References Cited

U.S. PATENT DOCUMENTS

| | | | |
|---|---|---|---|
| 7,446,654 B2 | 11/2008 | Addy | |
| 7,782,197 B2 | 8/2010 | Lang et al. | |
| 9,569,945 B2 | 2/2017 | Zumsteg et al. | |
| 9,660,050 B1 | 5/2017 | Wu et al. | |
| 2004/0056765 A1* | 3/2004 | Anderson | G08B 17/10 340/584 |
| 2005/0270537 A1* | 12/2005 | Mian | G01N 21/538 356/437 |
| 2006/0244837 A1 | 11/2006 | Ekeroth et al. | |
| 2007/0126871 A1* | 6/2007 | Henninger | H04N 7/181 348/151 |
| 2012/0026326 A1* | 2/2012 | Itoh | G06V 10/30 348/143 |
| 2014/0308074 A1 | 10/2014 | Rutz et al. | |
| 2014/0340525 A1* | 11/2014 | Johannesson | H04N 17/002 348/175 |
| 2018/0117642 A1 | 5/2018 | Magee et al. | |

FOREIGN PATENT DOCUMENTS

| | | |
|---|---|---|
| KR | 101148799 B | 5/2012 |
| KR | 101251942 B1 | 4/2013 |
| WO | 2000063863 A1 | 10/2000 |

\* cited by examiner

THERMOGRAPHIC DETECTOR DEVICE FOR A FIRE ALARM CONTROL SYSTEM

PRIORITY INFORMATION

This application is a continuation of U.S. application Ser. No. 16/517,079, filed Jul. 19, 2019, the contents of which are incorporated by reference.

TECHNICAL FIELD

The present disclosure relates generally to a thermographic detector device for a fire alarm control system.

BACKGROUND

Facilities, such as commercial facilities, office buildings, airports, hospitals, and the like, may have fire alarm control systems that can be used during an emergency situation (e.g., a fire) to manage a fire event in and/or around the facility. For example, a fire alarm control system may include sensors such as smoke detectors, heat detectors, and flame detectors, among other types of sensors, as well as control equipment such as fire alarm control panels. However, the environment of such facilities may present various challenges, such as dust, steam, etc., to the operational capabilities of the fire alarm control system.

DETAILED DESCRIPTION

Figure 1:
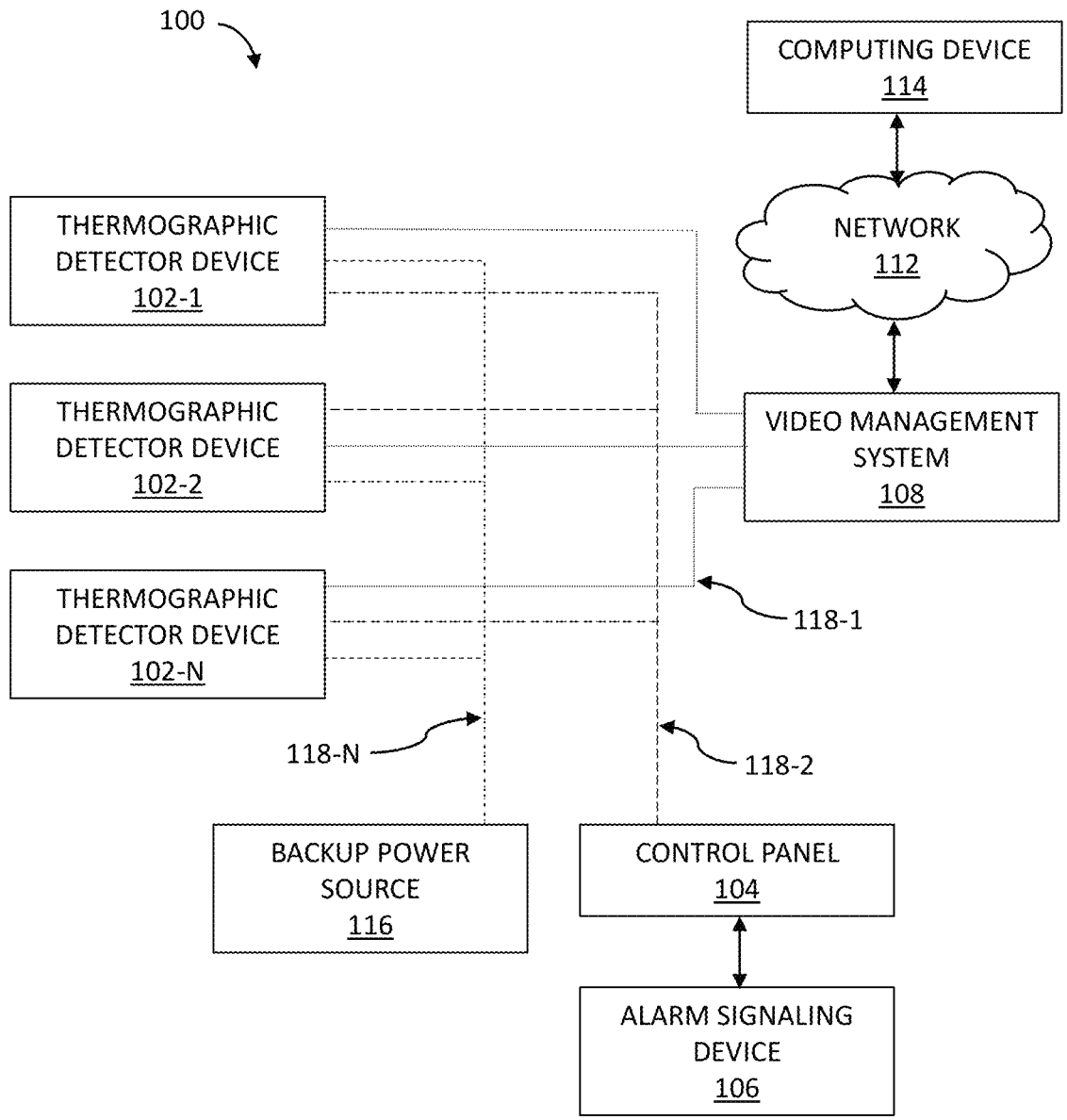
FIG. 1 is an example of an illustration of a fire alarm control system, in accordance with one or more embodiments of the present disclosure.

A thermographic detector device for a fire alarm control system is described herein. In some examples, one or more embodiments include a thermographic detector device, comprising a thermography camera configured to capture a thermal image within a field of view of the thermographic detector device, a memory and a processor to execute instructions stored in the memory to detect an alarm and/or fault associated with the thermographic detector device, where the fault includes at least one of a field of view fault, an operating parameter fault, and an internal fault, generate a fault signal upon detecting the fault, and provide a notification of the fault using the fault signal. Fault signals are also known as trouble signals.

A thermographic detector device for a fire alarm control system in accordance with the present disclosure can overcome challenges (e.g., dust, steam, etc.) presented by a facility that may cause previous detector devices to be inoperable. For instance, a thermographic detector device in accordance with the present disclosure may be able to provide visual verification of a fire occurring in the facility.

Further, previous detector devices for fire alarm control systems may only detect limited types of faults associated with the detector device, or may not be able to detect faults at all. For example, previous detector devices may detect and generate a fault signal associated with one type of fault, but may fail to detect other types of faults. Thus, these detector devices may not be capable of performing continuous and uninterrupted operation. As such, a fire alarm control system using such a detector device can fail to provide a notification of a fault associated with the detector device. Failure to provide a notification of the fault to a user may result in a failure to trigger and sound an alarm warning occupants of a facility of an emergency situation (e.g., a fire).

In contrast, a thermographic detector device for a fire alarm control system in accordance with the present disclosure can allow for immediate failsafe fault detection by being able to detect one or more of a plurality of different types of faults. For example, the thermographic detector device can detect that there is a fault associated with the thermographic detector device, where the fault includes at least one of a field of view fault, an operating parameter fault, and an internal fault. Upon detecting the fault, a fault signal can be generated, indicated locally and sent by the thermographic detector device to a control panel and/or computing device (e.g., a desktop or mobile device) to provide a notification of the detected fault. Additionally, in some cases, the thermographic detector device can determine the type of the fault associated with the thermographic detector device and generate a fault signal which includes an indication of the type of the detected fault. This can allow for users and/or occupants to easily determine that there is a fault associated with the thermographic detector device and, in some cases, what type of detected fault. As such, a user can more easily identify a fault and remotely monitor the fire alarm control system, allowing the user to make informed decisions regarding maintenance, saving on time, effort, and money. Further, such failsafe fault detection can ensure that the thermographic detector device is operating continuously and uninterrupted. Thus, in an emergency situation, occupants of the facility will receive a visual and/or audio notification.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N" as used herein, particularly with respect to reference numerals in the drawings, indicates that a number of the particular feature so designated can be included with a number of embodiments of the present disclosure. This number may be the same or different between designations.

FIG. 1 is an example of an illustration of a fire alarm control system 100, in accordance with one or more embodiments of the present disclosure. The fire alarm control system 100 can be the fire alarm control system of a facility (e.g., building), such as, for instance, a large facility having a large number of floors, such as a commercial facility, office building, airport, hospital, and the like. However, embodiments of the present disclosure are not limited to a particular type of facility.

Fire alarm control system 100 can include a plurality of components located throughout a facility (e.g., on different floors of the facility) that can be used to detect and/or manage a fire (e.g., heat and/or flame of the fire) occurring in the facility, and/or to prevent a fire from occurring in the facility. For example, the plurality of components may include thermographic detector devices 102-1, 102-2, ..., 102-N that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

As shown in FIG. 1, fire alarm control system 100 can include a plurality of thermographic detector devices 102-1, 102-2, ..., 102-N installed within the facility. Each of the respective thermographic detector devices 102-1, 102-2, ..., 102-N can include any type of thermography camera (e.g., thermographic imager, microbolometer, radiometric detector, etc.) configured to capture (e.g., detect) thermal images of a monitored area (e.g., an area within a field of view of the thermography camera lens) allowing for early detection of smoke and/or fire within a facility. For example, thermography cameras can form a heat zone image using long wave infrared (LWIR) radiation. The relationship between a surface of a body and the intensity of its emitted radiation can be used to determine the temperature of an object or area without physical contact. Additionally, thermographic detector devices 102-1, 102-2, ..., 102-N may be configured to detect flames within the monitored areas of thermographic detector devices 102-1, 102-2, ..., 102-N and provide video information to visualize the monitored area.

Thermographic detector devices 102-1, 102-2, ..., 102-N each can include a memory, and a processor configured to execute instructions stored in the memory to detect a fault associated with the thermographic detector device. As described further herein (e.g., in connection with FIG. 2), the fault can include at least one of a field of view fault, an operating parameter fault, and an internal fault. Additionally, thermographic detector devices 102-1, 102-2, ..., 102-N can be configured to generate a fault signal upon detecting the fault and provide a notification of the fault using the fault signal. For instance, the thermographic detector device can provide a notification of the fault to a user by sending the fault signal to a separate component of the fire alarm control system, as will be further described herein.

As shown in FIG. 1, fire alarm control system 100 can include a fire alarm control panel 104. Control panel 104 can be any different type of physical control panel, such as a control box, installed in the facility.

As used herein, the term "fire alarm control panel" refers to a controlling component of a fire alarm control system. For example, a fire alarm control panel can receive information from fire hardware devices (e.g., initiating devices) in the facility, monitor operational integrity of fire hardware devices in the facility, control fire hardware devices in the facility, and/or transmit information about fire hardware devices in the facility, among other operations. As an example, a fire alarm control panel can receive information from, monitor, control, and/or transmit information about sensors in the facility. As used herein, the term "sensor" refers to devices designed to detect and report fires.

Control panel 104 can be used by a user to monitor and/or control thermographic detector devices 102-1, 102-2, ..., 102-N, among other components of fire alarm control system 100. For instance, the user can use control panel 104 to directly control the operation of (e.g., actions performed by) thermographic detector devices 102-1, 102-2, ..., 102-N. Further, control panel 104 can receive (e.g., collect) data, such as, for instance, the fault signal generated by thermographic detector devices 102-1, 102-2, ..., 102-N. For instance, control panel 104 can receive the fault signal directly from thermographic detector devices 102-1, 102-2, ..., 102-N via transmission path 118-2 by which the thermographic detector devices and the control panel are communicatively coupled.

Control panel 104 can also receive data, such as, for instance, a detected temperature and/or video information (e.g., images) captured by thermographic detector devices 102-1, 102-2, ..., 102-N. For example, minimum, maximum, and/or rate of rise levels can be associated with temperature measurement or characteristic image patterns captured by the thermographic detector devices, which can indicate that there is an emergency situation (e.g., a fire). Upon detection of the emergency situation, control panel 104 can instruct alarm signaling device 106 to provide a visual and/or audio notification to occupants of the facility.

Additionally, fire alarm control system 100 can detect a failure associated with a connection between thermographic detector device 102 and control panel 104. The connection between thermographic detector device 102 and control panel 104 can contain a fault circuit for generating a fault signal and providing a notification of the fault using the fault signal. Additionally, the connection between thermographic detector device 102 and control panel 104 can contain an alarm circuit for generating an alarm signal and providing a notification of the alarm using the alarm signal. A loss of connection between thermographic detector device 102 and control panel 104 can prevent the detection and/or notification of a fault associated with the thermographic detector device. For example, the loss of connection can be caused by a short circuit in the fault circuit and/or an open circuit in the alarm circuit. Thus, fire alarm control system 100 can be configured to detect a fault associated with a connection between thermographic detector device 102 and control panel 104, and provide a notification of the fault associated with the connection.

As shown in FIG. 1, fire alarm control system 100 can include a video management system 108. Video management system 108 can be located remotely from the facility in which thermographic detector devices 102-1, 102-2, ..., 102-N and control panel 104 are installed and, in some embodiments, can be part of and/or coupled to a computing device 114 that is part of a centralized management platform located remotely from the facility. Video management system 108 can store data received by thermographic detector devices via transmission path 118-1 by which the thermographic detector devices and the video management system are communicatively coupled. Video management system 108 can communicate with computing device 114 via network 112, as illustrated in FIG. 1. For example, video management system 108 can receive data (e.g., a fault signal and/or video information) from thermographic detector devices 102-1, 102-2, . . . , 102-N and send (e.g., transmit and/or upload) the data to computing device 114 via network 112.

Network 112 can be a network relationship through which video management system 108 and computing device 114 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 112 can include a number of servers that receive information from, and transmit information to, video management system 108 and computing device 114 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, fire alarm control system 100 can include a backup power source 116, such as a battery backup. Backup power source 116 can be located remotely from the thermographic detector devices and the control panel, and can be located within the facility in which thermographic detector devices 102-1, 102-2, . . . , 102-N and control panel 104 are installed or remote from the facility. In an instance where there is a fault associated with the primary power source, which may be located within control panel 104, that prevents the primary power source from providing power to thermographic detector devices 102-1, 102-2, . . . , 102-N via transmission path 118-2, backup power source 116 can provide power to thermographic detector devices 102-1, 102-2, . . . , 102-N via transmission path 118-N. This can allow thermographic detector devices 102-1, 102-2, . . . , 102-N to continue to operate when there is a failure associated with the primary power source.

As shown in FIG. 1, fire alarm control system 100 can include an alarm signaling device 106. Alarm signaling device 106 can be configured to provide a notification of the fire to the occupants of the facility via a visual and/or audio notification. Alarm signaling device 106 can be installed within the facility in which thermographic detector devices 102-1, 102-2, . . . , 102-N and control panel 104 is installed. Control panel 104 can be configured to control the operation of alarm signaling device 106. For example, upon detection of an emergency situation (e.g., detecting flames within a thermal image) within the facility, control panel 104 can instruct fire signaling device 106 to provide the visual and/or audio notification.

As shown in FIG. 1, fire alarm control system 100 can include a computing device 114 configured to provide information associated with a detected fault to a user. Computing device 114 can be located remotely from the facility in which control panel 104 and thermographic detector 102 are installed allowing for a user to more easily monitor thermographic detector devices 102-1, 102-2, . . . , 102-N. Computing device 114 can receive a fault signal and/or video information from video management system 112 via network 112. The fault signal can include information associated with the fault including a time of the fault, a location of the fault, indicating information for the thermographic detector device, and a type of the thermographic detector device. Additionally, computing device 114 can receive, from video management system 108, and display images captured by thermographic detector devices 102-1, 102-2, . . . , 102-N.

As used herein, the term "computing device" can include a laptop computer, desktop computer, or mobile device, such as, for instance, a smart phone or tablet, among other types of computing devices. The computing device can include a user interface. A user can interact with the computing device via the user interface. For example, the user interface can provide (e.g., display) information to and/or receive information from (e.g., input by) the user of the computing device.

In some embodiments, user interface can be a graphical user interface (GUI) that can include a display (e.g., a screen) that can provide information to, and/or receive information from, the user of the computing device. The display can be, for instance, a touch-screen (e.g., the GUI can include touch-screen capabilities). As an additional example, the user interface can include a keyboard and/or mouse that the user can use to input information into the computing device, and/or a speaker that can play audio to, and/or receive audio (e.g., voice input) from, the user. Embodiments of the present disclosure, however, are not limited to a particular type(s) of user interface.

Figure 2:
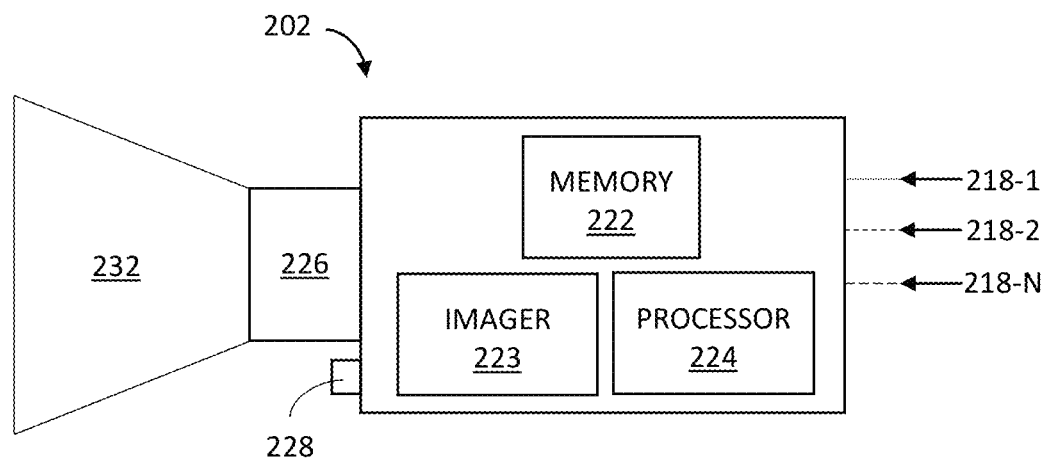
FIG. 2 is an example of an illustration of a thermographic detector device, in accordance with one or more embodiments of the present disclosure.

FIG. 2 is an example of an illustration of a thermographic detector device 202, in accordance with one or more embodiments of the present disclosure. Thermographic detector device 202 can be, for instance, the thermographic detector devices 102-1, 102-2, . . . , 102-N previously described in connection with FIG. 1.

As shown in FIG. 2, thermographic detector device 202 can include a processor 224 and a memory 222. The memory 222 can be any type of storage medium that can be accessed by the processor 224 to perform various examples of the present disclosure. For example, the memory 222 can be a non-transitory computer readable medium having computer readable instructions (e.g., computer program instructions) stored thereon that are executable by the processor 224 for detecting a fault associated with thermographic detector device 202 in accordance with the present disclosure.

The memory 222 can be volatile or nonvolatile memory. The memory 222 can also be removable (e.g., portable) memory, or non-removable (e.g., internal) memory. For example, the memory 222 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 222 is illustrated as being located within thermographic detector device 202, embodiments of the present disclosure are not so limited. For example, memory 222 can also be located internal to another computing resource (e.g., enabling computer readable instructions to be downloaded over the Internet or another wired or wireless connection).

Thermographic detector device 202 can be configured to detect a fault associated with thermographic detector device 202. The fault can include at least one of a field of view fault, an operating parameter fault, and an internal fault. Upon detecting the fault, thermographic detector device 202 can generate a fault signal and provide a notification of the fault using the fault signal.

In some examples, thermographic detector device 202 can be configured to determine the type of the detected fault, where the type is one of a field of view fault, an operating parameter fault, an internal fault, and a power supply fault. Upon detecting the type of the fault, thermographic detector device 202 can generate a fault signal that includes an indication of the type of the detected fault, and provide a notification of the detected fault using the fault signal.

The fault signal can be transmitted via one of the plurality of transmission paths 218-1, 218-2, . . . , 218-N within the fire alarm control system. This can allow for a user to be notified that thermographic detector device 202 and/or a separate component (e.g., a transmission path, a power source, an alarm signaling device, etc.) is not operating properly.

In an example, there can be a failure associated with a power supply of thermographic detector device 202. As previously described in connection with FIG. 1, thermographic detector device 202 can receive power from a power source, which can be a primary power supply located within a control panel or a backup power source (e.g., battery backup) located separate from the control panel and thermographic detector device 202. Thermographic detector device 202 can detect a failure associated with the power supply of (e.g., a drop of supply voltage to) thermographic detector device 202, such as a failure associated with the power supply functionality itself or the transmission path from the power source to thermographic detector device 202.

As shown in FIG. 2, thermographic detector device 202 can include a camera (e.g., lens) 226 with a field of view 232. As previously described, thermographic detector device 202 can capture thermal images within a monitored area of a facility. For example, thermographic detector device 202 can detect fire within the field of view 232 of the camera 226 of thermographic detector device 202. In some cases, there can be a fault that prevents thermographic detector device 202 from capturing thermal images and/or video information within field of view 232. The field of view fault can include at least one of an obstruction in the field of view, a degradation of view of thermographic detector device 202, a fault associated with a lens cleansing operation of thermographic detector device 202, and a masking of thermographic detector device 202.

In an example, there can be an obstruction in field of view 232 of thermographic detector device 202 that prevents thermographic detector device 202 from being able to permanently monitor its target area. For example, an obstruction can appear within field of view 232 and prevent thermographic detector device 202 from monitoring a target area of a facility. Additionally, field of view 232 can be degraded by an alteration of a focal length of lens 226 of thermographic detector device 202. Thermographic detector device 202 can detect a fault that prevents thermographic detector device 202 from monitoring the facility, such as a fault associated with thermographic detector device's 202 ability to detect an obstruction within field of view 232, collecting or comparing the collected images, and/or detect an alteration of the focal length of lens 226 of thermographic detector device 202. For example, thermographic detector device 202 can compare a series of images collected over a period of time by thermographic detector device 202 to an image collected at the time of commission to detect such a fault.

In an example, there can be a degradation of view of thermographic detector device 202. The ability of thermographic detector device 202 to capture thermal images can be diminished below the level needed to detect or fire due to, but not limited to, contamination from dust or dirt on lens 226 of thermographic detector device 202 or environmental conditions (e.g., dust, steam, etc.) within the field of view 232 of the thermographic detector device 202. Thermographic detector device 202 can detect a degradation of view of thermographic detector device 202 that can prevent thermographic detector device 202 from detecting an emergency situation within field of view 232.

In an example, there can be a fault associated with a lens cleansing operation of thermographic detector device 202. To reduce the risk of the degradation of view of thermographic detector device 202, a lens cleansing system can be installed within the fire alarm control system. As further described herein (e.g., in connection with FIG. 4), an example of such a system can include air rings or air blades that continuously blow compressed air onto the lens 226 of thermographic detector device 202. This can keep the lens free of dust and dirt. Thermographic detector device 202 can detect a fault associated with the lens cleansing operation (e.g., a loss of continuous air flow to the lens) that can prevent the lens cleansing system from operating.

In an example, there can be a masking of thermographic detector device 202. Thermographic detector device 202 (e.g., lens 226) depends on a free field of view to operate. In an instance where lens 226 of thermographic detector device 202 is masked, thermographic detector device 202 may not be able to monitor the facility. Masking can include, but is not limited to, physically covering lens 226 or spraying an opaque liquid on lens 226. Thermographic detector device 202 can detect when thermographic detector device 202 is unable to monitor the facility as a result of masking of the lens of thermographic detector device 202. Additionally, thermographic detector device 202 can detect when thermographic detector device 202 is unable to monitor the facility as a result of a partial obstruction of the lens of thermographic detector device 202. For example, a portion of the thermal image can be obstructed by an object being placed within field of view 232.

When the fire alarm control system is installed, thermographic detector device 202 can be calibrated and installed to operate in a manner that allows for detection and management of a fire event in and/or around the facility in which the thermographic detector device 202 is installed. However, a fault associated with an operating parameter can prevent thermographic detector device 202 from detecting and managing the fire event. The operating parameter fault can include at least one of a sensitivity drift of thermographic detector device 202, a deviation of a pan and tilt unit of thermographic detector device 202, and a deviation of thermographic detector device 202 from an initial target.

In an example, there can be a sensitivity drift of thermographic detector device 202. For instance, alarm levels of the detector device can be set to a particular temperature with a determined accepted tolerance, and thermographic detector device 202 can be calibrated to operate accordingly. Thermographic detector device 202 can detect a drift of sensitivity that causes thermographic detector device 202 to deviate from these set operating parameters and wrongly detect a fire event or cause a fire event to not be detected.

In an example, there can be a deviation of a pan and tilt unit of thermographic detector device 202. Thermographic detector device 202 can include a pan-tilt-zoom camera (PTZ camera) (e.g., imager 223 can be a PTZ camera). A PTZ camera is a camera that is capable of remote directional and zoom control. In contrast to fixed position cameras, PTZ cameras may position itself to pre-determined positions and fields of view in a pre-determined time sequence. Thermographic detector device 202 can electrically or mechanically detect a deviation from the pre-determined positions, field of views, and/or time sequence which may prevent thermographic detector device 202 from monitoring the facility. For instance, the thermographic detector device can use encoders to measure and record the position of camera 226 through the sequence and/or compare recorded images from different positions during previous sequences to those of subsequent sequences.

In an example, there can be a deviation of thermographic detector device 202 from an initial target. When installed within a facility, thermographic detector device 202 can be positioned so that the area which is intended to be monitored is within field of view 232. Thermographic detector device 202 can detect when the thermographic detector device 202 has deviated from the position such that the target area is not within field of view 232. Deviation of thermographic detector device 202 from an initial target can be the result of tampering with the mechanical mounting of thermographic detector device 202, among other examples.

Additionally, there can be internal faults associated thermographic detector device 202 which prevent thermographic detector device 202 from detecting an event (e.g., a fire alarm) within the facility. The internal fault can include at least one of saturation of a thermographic detector device 202 and an internal operation fault of thermographic detector device 202.

In an example, there can be a saturation of imager 223 of thermographic detector device 202. Imager 223 can be a sensor that can detect and convey information used to produce an image by converting radiated thermal energy into signals. For instance, if thermographic detector device 202 is directly exposed to direct or indirect light sources, such as the sun, flood lights, etc., imager 223 may become saturated, which can prevent thermographic detector device 202 from operating properly. Thermographic detector device 202 can detect when imager 223 has become saturated such that thermographic detector device 202 is prevented from monitoring the facility.

In an example, there can be an internal operation fault of thermographic detector device 202. The operation of thermographic detector device 202 can involve a number of internal factors which allow for continuous monitoring and detection by thermographic detector device 202 (e.g., by camera 226). These factors can include, but are not limited to, contrast, focus, brightness, sharpness, etc. Thermographic detector device 202 can detect a fault associated with any of these factors which can prevent thermographic detector device 202 from monitoring the facility.

Upon detection of at least one of a field of view fault, an operating parameter fault, and an internal fault, thermographic detector device 202 can generate a fault signal and provide a notification of the fault using (e.g., by transmitting) the fault signal. The fault signal can include information associated with the detected fault, such as the type of the fault.

As shown in FIG. 2, thermographic detector device 202 can transmit data via a plurality of transmission paths 218-1, 218-2, . . . , 218-N. For instance, upon generating the fault and/or alarm signal, thermographic detector device 202 can send the fault and/or alarm signal to a separate component of the fire alarm control system to provide a notification of the fault and/or alarm to a user, as previously described (e.g., in connection with FIG. 1). For example, thermographic detector device 202 can send the fault and/or alarm signal to a control panel, such as control panel 104 described in FIG. 1, via transmission path 218-2. Thermographic detector device 202 can also send the fault signal to a centralized system (e.g., video management system 108, as described in FIG. 1) via transmission path 218-1.

Additionally, thermographic detector device 202 can receive power via transmission path 218-N. For example, as previously described (e.g., in connection with FIG. 1), the fire alarm control system can include a power source that is located within or separate from the control panel. The power source can include a primary power source and/or a backup power source (e.g., a battery backup). In an instance where there is a fault associated with the primary power source (e.g., the primary power source no longer provides power to thermographic detector device 202), the secondary power source can transmit power to thermographic detector device 202.

Thermographic detector device 202 can also transmit data associated with the operation of thermographic detector device 202 to a control panel and/or a video management system. For example, thermographic detector device 202 can send video information to the video management system. The video information can include images that can allow a user to visualize the area monitored by thermographic detector device 202.

As shown in FIG. 2, thermographic detector device 202 can include a light source 228 configured to provide a notification of a detected fault. For example, light source 228 can be a light emitting diode (LED) or any other type of light source that can provide a notification of the detected fault and/or alarm. Upon detecting the fault or alarm, thermographic detector device 202 can generate a fault signal or alarm signal and notify a user of the detected fault or alarm, via illuminating light source 228. This can allow a user to more easily be notified that there is a fault associated with thermographic detector device 202 and that maintenance is needed. Alarm notification via light source 228 may take priority over fault notification via light source 228 when there is a detected fault and alarm occurring simultaneously.

Figure 3:
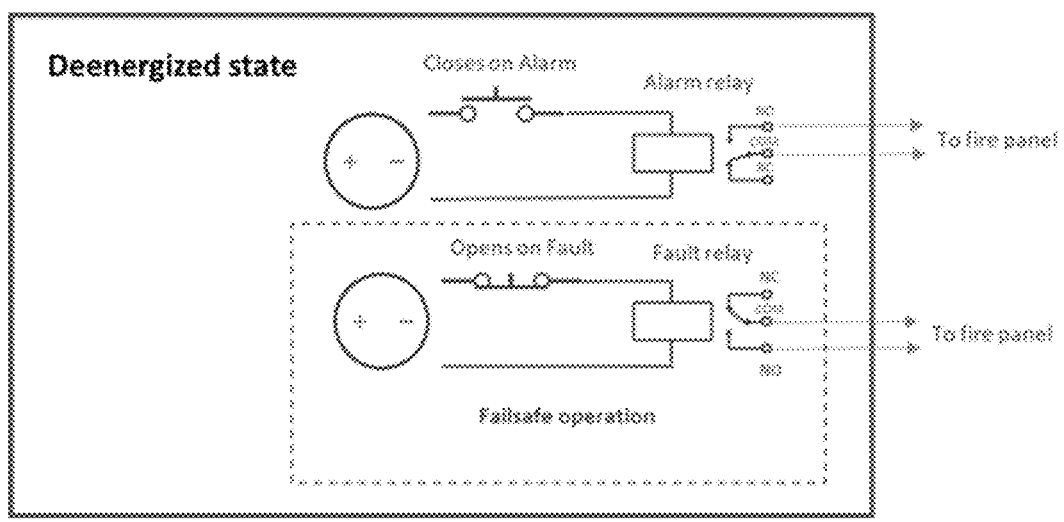
FIG. 3 is an example of an illustration of a loop communication system for use with a thermographic detector device, in accordance with one or more embodiments of the present disclosure.

FIG. 3 is an example of an illustration of a loop communication system 320 for use with a thermographic detector device, in accordance with one or more embodiments of the present disclosure. The thermographic detector device can be, for instance, the thermographic detector device previously described in connection with FIGS. 1 and 2. For example, thermographic detector device can be thermographic detector device 102 previously described in connection with FIG. 1 or thermographic detector device 202 previously described in connection with FIG. 2.

In some cases, there can be a fault associated with the transmission of an alarm signal between components of the fire alarm control system. For example, there can be a fault associated with alarm signaling of the thermographic detector device. Failsafe fault signaling allows for an alarm signal to always be transmitted to a fire alarm control panel (e.g., control panel 104 previously described in connection with FIG. 1) or to notify immediately that alarm transmission is no longer guaranteed. In such a case, if there is a fault associated with the transmission of the alarm signal, the fire alarm control system can use relay contacts and loop communication to guarantee alarm signaling. The fire alarm control panel can detect a fault associated with alarm signaling that would prevent the transmission of the alarm signal and notification of the detected fire.

In an example, there can be an interruption in a transmission path to or from the fire alarm control panel. As described herein (e.g., in connection with FIG. 1), the fire alarm control system can include a plurality of transmission paths, which can transmit a generated fault or alarm signal from the thermographic detector device, power to thermographic detector device, and operating data from the thermographic detector device, among other data associated with the fire alarm control system. If there is an interruption (e.g., break) in any one of the transmission paths, components within the fire alarm control system may be unable to transmit data or signals. The fire alarm control panel can permanently supervise the transmission paths to immediately detect an interruption in a transmission path to or from the thermographic detector device that would prevent the use of the transmission paths. As shown in FIG. 3, a fire alarm control system can use relay contacts to ensure that if a fault associated with the transmission of an alarm signal from a thermographic detector device to a fire alarm control panel occurs, the fault signal will still be transmitted. System 320 allows for failsafe fault signaling from the thermographic detector device to the control panel. For example, the fire alarm control panel can detect when a relay is energized, and, therefore, closes its contacts. Additionally, as shown in FIG. 3, the fire control panel can also detect when there is a fault associated with a transmission path, such as a power loss (e.g., circuit 320 enters a de-energized state), which causes the relay to open. This can allow for an uninterrupted transmission of the alarm signal.

Figure 4:
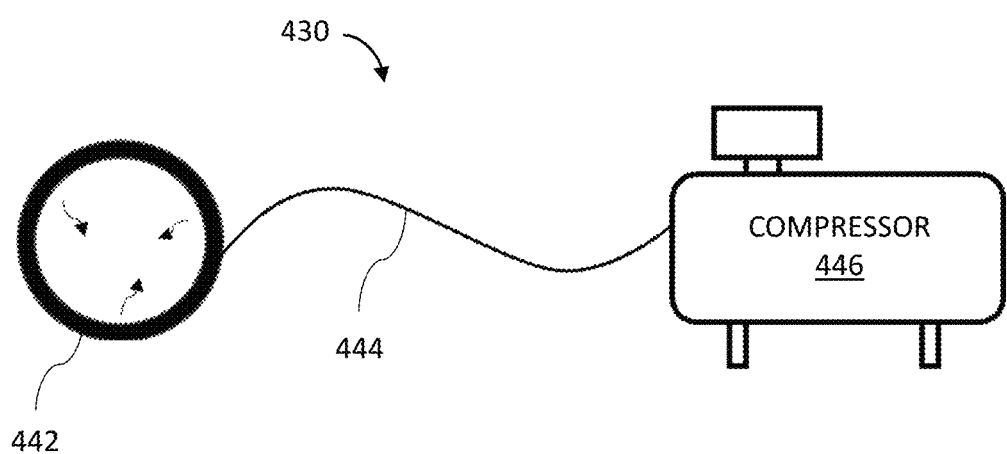
FIG. 4 is an example of an illustration of a lens cleansing system for use with a thermographic detector device, in accordance with one or more embodiments of the present disclosure.

FIG. 4 is an example of an illustration of a lens cleansing system 430 for use with a thermographic detector device, in accordance with one or more embodiments of the present disclosure. As previously described (e.g., in connection with FIG. 2), the thermographic detector device can include leans cleansing system 430 to minimize the risk of the degradation of view of the thermographic detector device. The thermographic detector device can be, for instance, the thermographic detector device previously described in connection with FIGS. 1 and 2. For example, thermographic detector device can be thermographic detector device 102 previously described in connection with FIG. 1 or thermographic detector device 202 previously described in connection with FIG. 2.

While not limited to such an embodiment, lens cleansing system 430 can include an air ring 442, a hose 444, and a compressor (e.g., air pump) 446. For example, compressor 446 can be configured to continuously provide air, via hose 444, to air ring 442. Upon receiving air from compressor 446, air ring 442 can continuously blow the compressed air onto the lens of a thermographic detector device. This can keep the lens free of dust and dirt. The thermographic detector device can detect a fault associated with lens cleansing system 430 which may prevent air ring 442 from continuously blowing the compressed air onto the lens of a thermographic detector device and allow for degradation of view of the thermographic detector device.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A thermographic detector device for a fire alarm control system, comprising:
    a thermography camera;
    a memory; and
    a processor configured to execute instructions stored in the memory to:
        detect a fault associated with the thermographic detector device;
        determine a type of the detected fault, wherein the type of the detected fault is:
            an operating parameter fault associated with the thermographic detector device, wherein the operating parameter fault is a sensitivity drift of the thermographic detector device; or
            an internal fault associated with the thermographic detector device, wherein the internal fault is a saturation of an imager of the thermographic detector device;
        generate a fault signal that includes an indication of the determined type of the detected fault; and
        provide a notification of the detected fault using the fault signal, wherein the notification includes the indication of the determined type of the detected fault.

2. The thermographic detector device of claim 1, wherein the thermography camera is configured to capture a thermal image within a field of view of the thermographic detector device.

3. The thermographic detector device of claim 1, wherein the processor is configured to execute the instructions to generate the fault signal upon determining the type of the detected fault.

4. The thermographic detector device of claim 1, wherein the type of the detected fault is a degradation of view of the thermographic detector device.

5. The thermographic detector device of claim 1, wherein the type of the detected fault is a field of view fault associated with the thermographic detector device.

6. The thermographic detector device of claim 1, wherein the fault signal includes an indication of a time the fault was detected.

7. The thermographic detector device of claim 1, wherein the fault signal includes an indication of a location of the thermographic detector device.

8. The thermographic detector device of claim 1, wherein the fault signal includes an indication of a type of the thermographic detector device.

9. The thermographic detector device of claim 1, wherein the thermographic detector device includes a lens cleansing system.

10. A non-transitory computer readable medium having computer readable instructions stored thereon that are executable by a processor to:
   detect a fault associated with a thermographic detector device;
   determine a type of the detected fault, wherein the type of the detected fault is:
      an operating parameter fault associated with the thermographic detector device, wherein the operating parameter fault is a sensitivity drift of the thermographic detector device; or
      a fault associated with a communication between the thermographic detector device and a control panel of a fire alarm control system, wherein the communication is a fault signal generated by a fault circuit or an alarm signal generated by an alarm circuit;
   generate a fault signal that includes an indication of the determined type of the detected fault; and
   provide a notification of the detected fault using the fault signal, wherein the notification includes the indication of the determined type of the detected fault.

11. The medium of claim 10, wherein the type of the detected fault is an alteration of a focal length of a lens of the thermographic detector device.

12. The medium of claim 10, wherein the instructions are executable by the processor to:
   capture a thermal image within a field of view of the thermographic detector device;
   detect flames within the thermal image; and
   generate an alarm signal upon detecting the flames.

13. A method of operating a thermographic detector device for a fire alarm control system, comprising:
   detecting a fault associated with the thermographic detector device;
   determining a type of the detected fault, wherein the type of the detected fault is:
      an internal fault associated with the thermographic detector device, wherein the internal fault is a saturation of an imager of the thermographic detector device; or
      a fault associated with a communication between the thermographic detector device and a control panel of the fire alarm control system, wherein the communication is a fault signal generated by a fault circuit or an alarm signal generated by an alarm circuit;
   generating, upon determining the type of the detected fault, a fault signal that includes an indication of the determined type of the detected fault; and
   sending, to the control panel, a notification of the detected fault using the fault signal, wherein the notification includes the indication of the determined type of the detected fault.

14. The method of claim 13, wherein the type of the detected fault is an object within a field of view of the thermographic detector device.

15. The method of claim 13, wherein the type of the detected fault is an operating parameter fault associated with the thermographic detector device.

16. The method of claim 13, wherein the method includes sending the notification of the detected fault to the control panel via a transmission path by which the thermographic detector device and the control panel are communicatively coupled.

17. The method of claim 13, wherein the method includes providing power to the thermographic detector device from a power supply of the control panel.

18. The method of claim 13, wherein the method includes providing power to the thermographic detector device from a power supply located remotely from the thermographic detector device and the control panel.

* * * * *